(12) United States Patent
Anderson et al.

(10) Patent No.: US 8,839,134 B2
(45) Date of Patent: Sep. 16, 2014

(54) PROJECTION INTERFACE TECHNIQUES

(75) Inventors: Glen J. Anderson, Beaverton, OR (US); Subhashini Ganapathy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 12/978,533

(22) Filed: Dec. 24, 2010

(65) Prior Publication Data

US 2012/0166993 A1     Jun. 28, 2012

(51) Int. Cl.
    *G06F 3/048*     (2013.01)
    *G06F 3/01*     (2006.01)
    *G06F 1/16*     (2006.01)

(52) U.S. Cl.
    CPC .............. *G06F 1/1639* (2013.01); *G06F 3/017* (2013.01)
    USPC ........................................................ 715/771

(58) Field of Classification Search
    CPC ........ G06F 3/048; G06F 3/017; G06F 1/1639
    USPC ......................................... 715/771, 773, 702
    See application file for complete search history.

(56) References Cited

U.S. PATENT DOCUMENTS

| | | | |
|---|---|---|---|
| 5,714,698 A | 2/1998 | Tokioka et al. | |
| 6,614,422 B1 * | 9/2003 | Rafii et al. ..................... | 345/168 |
| 6,628,309 B1 * | 9/2003 | Dodson et al. ................. | 715/769 |
| 7,457,944 B1 * | 11/2008 | Nanja ............................... | 713/1 |
| 7,804,492 B2 * | 9/2010 | Chang ............................ | 345/173 |
| 2003/0128190 A1 * | 7/2003 | Wilbrink et al. .............. | 345/169 |
| 2006/0101349 A1 * | 5/2006 | Lieberman et al. ........... | 715/773 |
| 2007/0028176 A1 * | 2/2007 | Perdomo et al. ............... | 715/741 |
| 2009/0021525 A1 * | 1/2009 | Chuang et al. ................. | 345/593 |
| 2010/0031201 A1 * | 2/2010 | de Haan ......................... | 715/863 |
| 2010/0039379 A1 * | 2/2010 | Hildreth ......................... | 345/156 |
| 2010/0067181 A1 | 3/2010 | Bair et al. | |
| 2010/0107081 A1 * | 4/2010 | Benenson ...................... | 715/730 |
| 2011/0169746 A1 * | 7/2011 | Kitajima ........................ | 345/173 |
| 2012/0017147 A1 * | 1/2012 | Mark ............................. | 715/702 |

FOREIGN PATENT DOCUMENTS

| | | |
|---|---|---|
| EP | 1315072 | 5/2003 |
| JP | 2003-076495 | 3/2003 |
| TW | 200411527 A | 7/2004 |
| TW | 200641649 A | 12/2006 |
| WO | WO 00-21024 | 4/2000 |

OTHER PUBLICATIONS

PCT Search Report, PCT/US2011/065301, Intel Corporation, Dec. 15, 2011, 8 pages.
Taiwan IPO Search Report, Apr. 1, 2014, received for Taiwan Patent Application No. 100147133, 2 pages.

* cited by examiner

*Primary Examiner* — William Bashore
*Assistant Examiner* — Jeanette J Parker
(74) *Attorney, Agent, or Firm* — Blakely, Sokoloff, Taylor & Zafman LLP

(57) ABSTRACT

Techniques are disclosed that involve projection interfaces, such as multitouch projected displays (MTPDs). For example, a user may activate a projection interface without having to interact with the a non-projected interface (e.g., a keyboard or keypad). Also, a user may select or adjust various device settings. Moreover, various user applications may be allocated among a projected interface and another display (e.g., an integrated display device). Such techniques may be employed in various environments, such as ones in which a display input devices exist in addition to a projection interface. Through such techniques, ease of use for projection interfaces may be advantageously achieved.

17 Claims, 5 Drawing Sheets

PROJECTION INTERFACE TECHNIQUES

BACKGROUND

Projection interfaces, such as multi-touch projected displays (MTPDs), provide projections from computing devices that allow users to make inputs directly on the projection. Such interfaces are useful because they can allow touchscreen-like usage models with more flexibility than a touch screen.

Moreover, projection interfaces may provide size and weight reductions for devices. For instance, an MTPD-equipped mobile device may provide its user with traditional capabilities, without requiring large input and output devices (e.g., keyboards and displays).

Conventional input and output devices may exhibit wear and damage may occur through normal operations, as well as through misuse (e.g., through heavy-handed operation and/or handling with dirty hands). However, projection interfaces provide for touch-less user interactions. As a result, concerns of input and output devices becoming worn and damaged may be alleviated.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques involving projected user interfaces, such as multi-touch projected displays (MTPDs). For example, a user may activate a projection interface without having to interact with a non-projected interface (e.g., a keyboard or keypad). Also, a user may select or adjust various device settings. Moreover, such techniques provide for various user applications to be allocated among a projected interface and another display (e.g., an integrated display device). Such techniques may be employed in various environments, such as ones in which a display input devices exist in addition to a projection interface. Through such techniques, ease of use for projection interfaces may be advantageously achieved.

Figure 1:
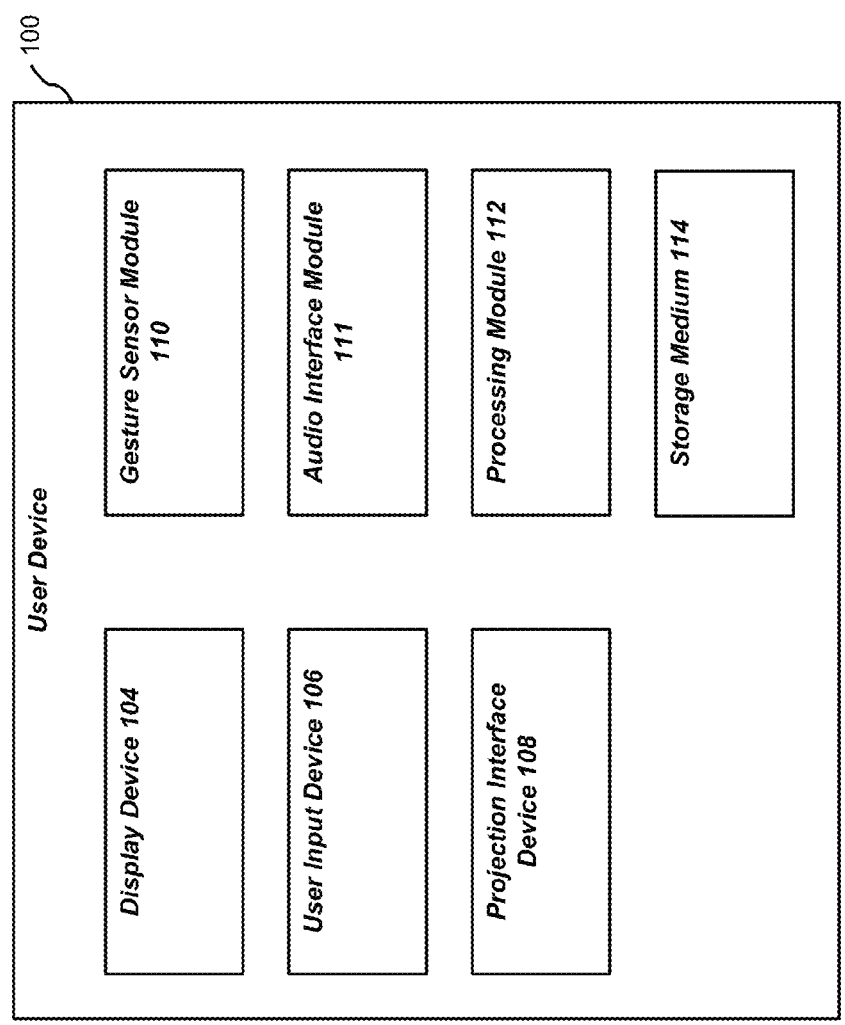
FIG. 1 is a diagram of an exemplary operational environment.

FIG. 1 is a diagram of an exemplary user device 100. As shown in FIG. 1 user device 100 includes a display device 104, a user input device 106, a projection interface device 108, a gesture sensor module 110, an audio interface module 111, a processing module 112, and a storage medium 114. These elements may be implemented in any combination of hardware and/or software.

User device 100 may be various types of devices. For example, user device 100 may be a personal computer (PC), such as a desktop, notebook, or tablet PC. Alternatively, user device 100 may be a handheld device, such as a mobile phone (e.g., a smartphone) or a personal digital assistant (PDA). Embodiments, however, are not limited to these examples.

Display device 104 includes a physical display that provides a visual output to a user. In embodiments, display device 104 may be integrated within user device 100. Alternatively, display device 104 may be coupled to user device 100 through a wired or wireless communications interface. This output may be in the form of sequential images (or frames). Exemplary physical displays include light emitting diode (LED) displays, liquid crystal displays (LCDs), plasma displays, and cathode ray tube (CRTs). Embodiments, however, are not limited to these examples. Each of the frames output by integrated display device 104 may comprise multiple pixels. Data representing these pixels (e.g., color and/or intensity values) may be stored in one or more frame buffers within integrated display device 104. This data may be referred to as "frame data". Such frame buffer(s) may be provided by a storage medium such as volatile random access memory (RAM) (e.g. dynamic RAM). However, other types of storage media, such as non-volatile memory, may be employed.

User input device 106 allows users to interact with user device 100. For instance, user input device 106 may allow users to select various content items for outputting through output device 104. Additionally or alternatively, user input device 106 may allow users to direct the manner in which such content is output (e.g., by manipulating one or more graphical interface elements). User input interface 106 may include one or more devices. Examples of such devices include (but are not limited to) keypads, keyboards, and touchscreens (e.g., implemented through output device 104), handheld remote controls, and gesture-based controls.

Projection interface device 108 includes components to provide a projected user interface. In embodiments, the projected user interface is a multi-touch projection display (MTPD) interface that may simultaneously register three or more distinct positions of input touches. In embodiments, the projection interface device 108 may be integrated within user device 100. Alternatively, projection interface device 108 may be coupled to user device 100 through a wired or wireless communications interface.

The projected user interface may be in the form of sequentially projected images (or frames), each comprising multiple pixels. Data representing these pixels (e.g., color and/or intensity values) may be stored in one or more frame buffers within projection interface device 108. This data may be referred to as "frame data". Such frame buffer(s) may be provided by a storage medium such as volatile random access memory (RAM) (e.g. dynamic RAM). However, other types of storage media, such as non-volatile memory, may be employed.

In embodiments, projection interface device 108 may include components, such as light sources (e.g., a laser) and optics (e.g., lenses) to project a display onto a surface. This display may include projected output elements (e.g., windows showing applications, content, etc.), as well as projected user input elements (e.g., buttons, keyboards, keypads, etc.).

Moreover, projection interface device 108 may include sensors that detect a user's interaction with the projected display (e.g., virtual keystrokes, gestures, etc.). Such detection may be based on reflections of projected light (e.g., infrared light). Thus, projection interface device 108 may include a light source and optical (e.g., lenses) to project such light.

Gesture sensor module 110 may include one or more image sensors to detect a user's gestures. Such sensors may be arranged to provide one or more detection regions. Such detection regions may be on or in the proximity of integrated display device 104 and/or a projected interface generated by projection interface device 108. Embodiments, however, are not limited to these examples. Moreover, gesture sensor module 110 may include elements that process and identify gestures, such as various pattern recognition processing components. Such components may be implemented in any combination of hardware and/or software. Gesture module 110 may be integrated with user device 100 or coupled to user device 100 through a wired or wireless communications interface.

Audio interface module 111 provides for the output of audio to users, as well as the input of audio from users. Accordingly, audio interface module 111 may include components, such as one or more speakers to generate acoustic signals from audio streams generated by content items, as well as by user applications and other software processes. In embodiments, audio interface module 111 may further include components, such as audio codec(s), digital-to-analog converter(s) (DAC(s)), filter(s), and amplifier(s) to convert digital signals into an analog signal for the speaker(s).

Further, audio interface module 111 may provide for the input of audio signals from users. Such audio input may be in the form of voice commands that control features of applications and/or user interfaces. Thus, audio interface module 111 may include components, such as microphone(s), amplifier(s), filter(s), analog-to-digital converter(s) (ADC(s)), and speech codecs. Moreover, audio interface module 111 may include components to perform speech/voice recognition on received speech signals. Results of such recognition may be provided to applications and/or other processes provided by device 100. Components of audio interface module 111 may be implemented in any combination of hardware and/or software.

Processing module 112 may include one or more processors (e.g., microprocessors). Such processors may include a central processing unit (CPU) and/or a graphics processing unit (GPU). Such processors may be single core or multi-core processors.

Storage medium 114 may include control logic or instructions (e.g., software) that may be executed by processing module 112. The execution of such instructions may provide various features, as described herein. Additionally or alternatively, storage medium 114 may store information in the form of content items. Such content items may include video, audio, games, messages, documents, and/or application files (e.g., word processing documents, spreadsheets, etc.). Embodiments, however, are not limited to these examples. FIG. 1 shows storage medium 114 being within user device 100 However, storage medium 114 may also include media that is outside of user device 100, user device 100 may access such media may through various wired and/or wireless communications media.

Figure 2:
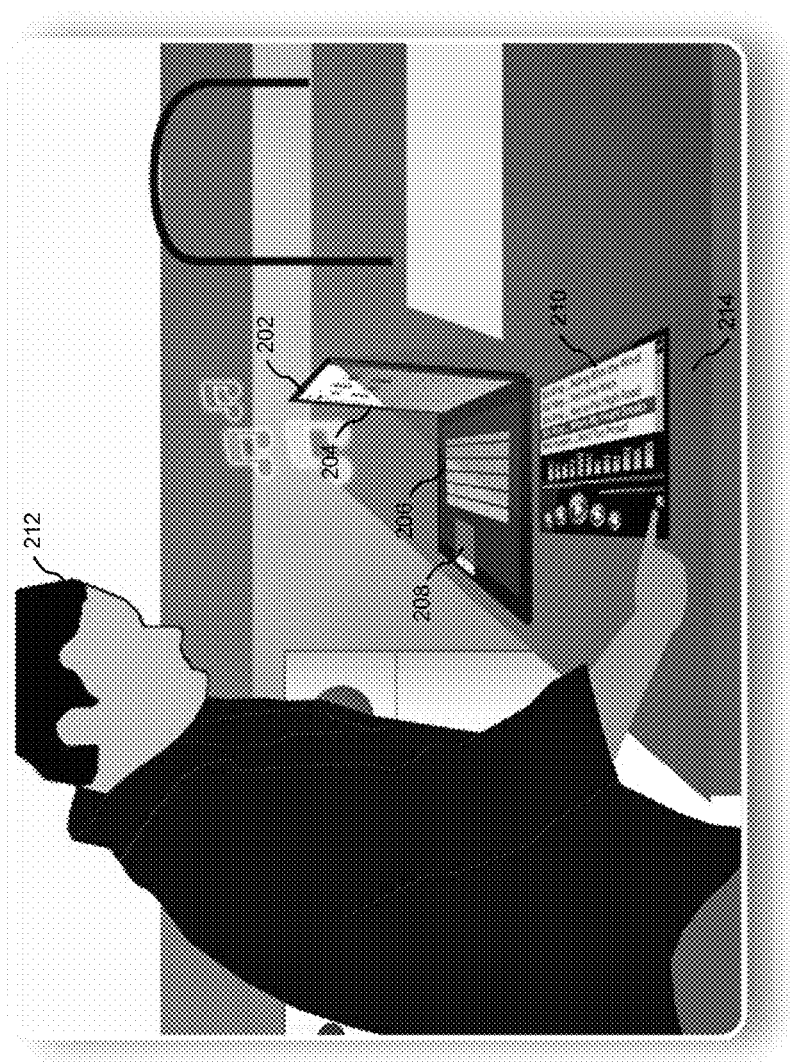
FIG. 2 is a diagram of an exemplary operational scenario.

FIG. 2 is a view of an exemplary operational scenario 200 provided by an apparatus 202, such as user device 100. In this scenario, apparatus 202 is implemented as a notebook computer. However, as described above, embodiments are not limited to such implementations.

More particularly, FIG. 2 shows apparatus 202 providing an integrated display device 204, a keyboard 206, a touchpad and buttons 208, and a projection interface 210.

In general operation, apparatus 202 may provide a user 212 with one or more processing applications. Such processing applications may involve receiving user inputs and provide visual and/or audio outputs. Moreover, apparatus 202 may concurrently provide multiple processing applications to user 212. Exemplary applications include (but are not limited to) e-mail, messaging, media players, word processing, Internet browsing, and so forth.

Integrated display device 204 may provide a user with visual outputs corresponding to such processing application(s). Moreover, keyboard 206 and/or touchpad and buttons 208 may allow the user to provide inputs for such processing application(s).

Alternatively or additionally, user device 100 may employ projection interface 210 to provide visual outputs and receive user inputs. As shown in FIG. 2, projection interface 210 is projected onto a surface 214. In embodiments, projection interface 210 may include a screen (analogous to a display screen) for the display of traditional graphical user interface (GUI) elements. Additionally, projection interface 210 may include a user input portion, which may provide projected keyboard(s), keypad(s), buttons, and other user input mechanisms. Embodiments, however, are not limited to these examples.

Despite these features, potential interaction complexities may arise. For example, complexities may arise in establishing operational settings for projection interface 210 and/or for integrated display device 204. Also, complexities may arise in activating of projection interface 210, as well as in allocating processing applications among integrated display device 204 and projection interface 210.

However, embodiments provide features that may advantageously alleviate such complexities. For example, embodiments may provide techniques that allow user 212 initiate projection interface 210 without having to interact with keyboard 206 and/or touchpad and buttons 208.

Also, embodiments may provide for user 212 to adjust projection interface 210 settings (e.g., color settings) in a manner that is independent of the settings for integrated display device 204. Thus, a user may advantageously select settings that achieve good visibility on surface 214, without compromising settings on integrated device 204 (which may already be satisfactory to user 212). Moreover, embodiments may allow user 212 to move application(s) between integrated display device 204 and projection interface 210.

Figure 3:
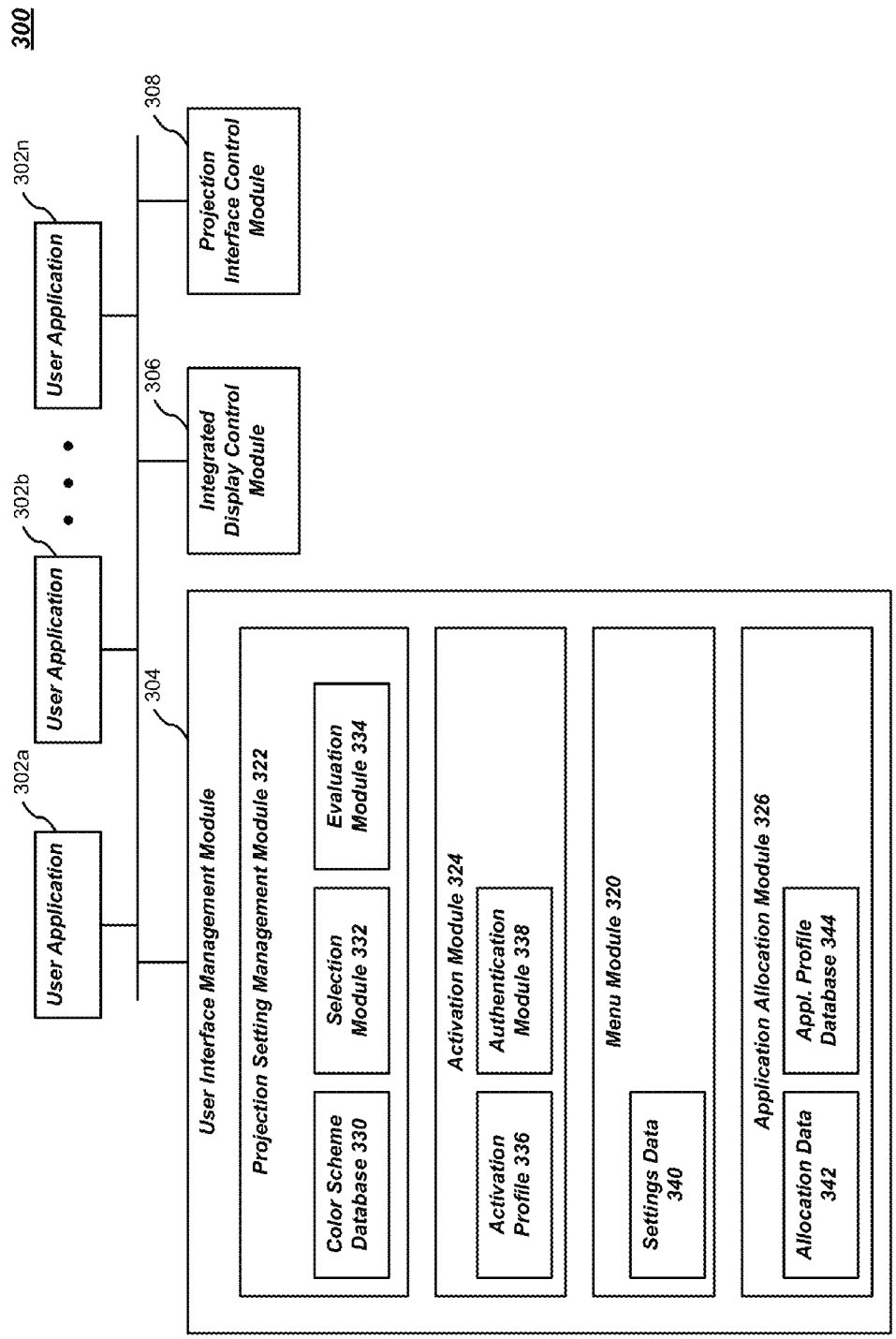
FIG. 3 is a diagram of an exemplary implementation.

FIG. 3 is a diagram of an implementation 300. In the context of FIG. 1, implementation 300 may be included in user device 100. Also, in the context of FIG. 2, implementation 300 may be included in apparatus 202. Embodiments, however, are not limited to these contexts.

As shown in FIG. 3, implementation 300 may include a plurality of user applications 302a-n, a user interface (UI) management module 304, an integrated display control module 306, and an projection interface control module 308. These elements may be implemented in any combination of hardware and/or software.

As described herein, exemplary applications include (but are not limited to) e-mail, messaging, media players, word processing, Internet browsing, and so forth. Such applications may receive user inputs, as well as provide visual and/or audio outputs. These user interactions may be through a conventional display device and input devices (e.g., keyboards, mouse, etc.). Alternatively or additionally, these user interactions may be through a projection interface (e.g., a MTPD).

In embodiments, each of user applications 302a-n may be represented through one or more corresponding graphical user interface (GUI) elements (e.g., one or more windows). User interface (UI) management module 304 may provide applications with such GUI elements. As a result, such user interface elements may be presented to the user through an integrated display (e.g., integrated display device 104 of FIG.

1) and/or through a projection interface (e.g., as provided by projection interface device 108 of FIG. 1).

Additionally, UI management module 304 allows for users to manage user interface features and settings pertaining to the operation of a projection interface and an integrated display device. Further details regarding UI management module 304 are provided below.

Integrated display control module 306 performs operations involving the outputting of information to an integrated display device (such as integrated display device 104 of FIG. 1). For example, integrated display control module 306 may receive information originated by one or more of user applications 302*a-n*. In turn, integrated display control module 306 may generate signals (or display data) to be output on the integrated display.

This generation of display data may involve the employment of a graphics engine or pipeline (not shown) to generate the display data based on one or more graphics instructions and/or primitives. The display data generated by integrated display control module 306 may be arranged in a sequence of frames. Thus, integrated display control module 306 may include one or more frame buffers to store such frames.

Projection interface control module 308 performs operations involving the exchange of information with a user through a projection interface. Thus projection interface control module 308 may interact with a projection interface device (e.g., projection interface device 108 of FIG. 1). This exchange may involve the generation of signals (or display data) to be projected onto a surface.

This generation of display data may involve the employment of a graphics engine or pipeline (not shown) to generate the display data based on one or more graphics instructions and/or primitives. The display data generated by projection interface control module 308 may be arranged in a sequence of frames for projection by the projection interface device. Thus, projection interface control module 308 may include one or more frame buffers to store such frames.

Additionally, this exchange of information with a user through the projection interface may involve the reception of user inputs. Thus, projection interface control module 308 receives signals generated by one or more input sensors of the projection interface device. In turn, projection interface control module 308 interprets these signals as particular user inputs (e.g., keystrokes, button activations, mouse control, etc.) Such inputs may be sent to one or more corresponding user applications 302*a-n*.

As described above, integrated display control module 306 and projection interface control module 308 may each exchange information with one or more of user applications 302*a-n*. Such exchanges may occur directly. Alternatively, such exchanges may occur through an intermediate element. For example, such exchanges may be through user interface management module 304.

As described above, UI management module 304 allows for users to manage user interface features and settings pertaining to the operation of an projection interface and an integrated display device. FIG. 3 shows that user interface management module 304 may include a menu module 320, a projection setting management module 322, an activation module 324, and an application allocation module 326. These elements may be implemented in any combination of hardware and/or software.

Projection setting management module 322 provides for the selection of color schemes and/or patterns for the projected display. Such selections may be made by a user. Alternatively, such selections may be automatic. A common problem with projected displays is that the surface being projected upon may interfere with the color(s) and/or pattern(s) that are being projected. Also, sometimes a user may desire to have a particular color-scheme or "skin" to suit a situation. Thus, through projection setting management module 322, such problems may be overcome.

FIG. 3 shows projection setting management module 322 storing a color scheme database 330 that includes configuration information for multiple color schemes. This information may include colors for different aspects or portions of a projected display. For example, configuration information for a particular color scheme may indicate colors for background, borders, projected keyboards, buttons, window features, and so forth. In embodiments, this configuration information may be preset. However, a user may also create particular color schemes (and their corresponding configuration information) for storage in database 330.

FIG. 3 further shows that projection setting management module 322 includes a selection module 332. This module selects one of the color schemes stored within database 330. Upon such a selection, the corresponding color scheme is employed by the projection interface.

In embodiments, this selection may be a user selection. Such a selection may be received through the projection interface. Alternatively, such a selection may be through a non-projected input device (e.g., a keyboard, keypad, or mouse). Thus, a user may toggle through one or more color schemes.

In further embodiments, this selection may be made automatically. For example, FIG. 3 further shows that projection setting management module 322 includes an evaluation module 334. In embodiments, evaluation module 334 receives measurements (e.g., color contrast measurements) from projection interface control module 308. These measurements convey characteristics of a currently projected projection interface.

Based on such measurements, evaluation module 334 may determine whether the current color scheme is acceptable (e.g., if contrast levels are above a predetermined threshold). If not, then evaluation module 334 may cause selection module 332 to select another color scheme from database 330. In turn, this scheme is employed by the projection interface and evaluation module 334 receives further measurements corresponding to this scheme. As a result, evaluation module 334 may cause selection module 332 to toggle through one or more color schemes until satisfactory measurements are received.

In general operation, the projection interface may not be activated at all times. Thus, activation module 324 provides the projection interface to be activated based on various user actions. For example, activation module 324 may activate the projection interface upon a user making a predetermined gesture. In embodiments, such a gesture may be received by one or more sensors of the projection interface device. In turn, projection interface control module 308 may employ various pattern recognition techniques to recognize the gesture as a predetermined activation gesture. Based on this recognition, projection interface control module 308 sends an activation gesture indication to activation module 324.

Upon receipt of this indication, activation module 324 may activate the projection interface. In embodiments, this activation may be in accordance with a stored activation profile 336.

Activation profile 336 may specify one or more activation characteristics or requirements. For instance, activation profile 338 may indicate one or more user applications that may be presented through the projection interface without requiring a user to login or engage in an authentication process. For example, a user may be given access to playing media on the projection interface without having to log in. However, the employment of other applications (e-mail, web browsing, etc.) would require a login and/or authentication.

Thus, activation profile 336 may require that a login and/or authentication process needs to be performed before some or any user capabilities through the projection interface are activated. Accordingly, FIG. 3 shows that activation module 324 includes an authentication module 338. In response to the activation gesture indication, authentication module 338 may initiate the presentation of a login (e.g., username and password) and/or user authentication dialog to the user. Such login/authentication features may be presented to the user through the projection interface. However, in embodiments, such login/authentication features may be presented to the user through the integrated display device.

Through such features, embodiments allow for a user to activate and interact with the projection interface without touching the corresponding device. Thus may be desirable, for example, if the user's hands are dirty, or if the user is cooking. Moreover, in embodiments, the projection interface may be activated without the user having to focus on a windows-based user interface.

In embodiments, menu module 320 may provide a device control menu through the projection interface. A user may employ this menu to establish one or more settings for the device.

Exemplary settings include (but are not limited to) audio output volume, projection interface display brightness, projection interface display contrast, projection interface display focus, projection interface font size, projection interface projector on/off, Gesture sensor on/off, and integrated display device on/off.

Further, the device control menu may allow the user to select display management attributes. For example, the device control menu may allow the user to select a primary display (e.g., the integrated display device or the projection interface). In embodiments, the primary display may be used for visual output of all (or some) user applications and/or content. This feature may be implemented as a button for toggling between the integrated display device and the projection interface as the primary display.

Also, the device control menu may allow the user to select among various display modes. Such modes may include (but are not limited to) a duplicate display mode (in which the projection interface shows the same information as the integrated display device), extended desktop mode (in which the integrated display device and projection interface provide a larger extended user interface space), and appliance mode (in which the projection interface shows a devoted set of applications that are separate from what the user experiences in the regular operating system UI, and the integrated display device shows a standard operating system desktop). This feature may be implemented through one or more buttons that allows easy user selection (e.g., toggling) among such modes.

Further, the device control menu may allow the user to allocate user gesture and/or user voice input to the projection interface and the integrated display device. For example, the user may select for user voice commands to be applied only to current application(s) on either the projection interface or the integrated display. Similarly the user may select for user gesture commands (e.g., received through the projection interface) to impact applications on either the projection interface or the integrated display.

Accordingly, FIG. 3 shows menu module 320 storing settings data 340, which is selected by the user through the projected device control menu. In embodiments, settings data 340 may include a variable for each setting that the user may select through the projected device control menu. Based on these variables, menu module 320 may cause corresponding settings to be established. For example, this may comprise menu module 320 directing projection interface control module 308 and/or integrated display control module 306 to employ these settings.

In embodiments, user applications 302*a-n* may be allocated among the integrated display device and the projection interface. Such allocations are managed may application allocation module 326. As shown in FIG. 3, application allocation module 326 includes allocation data 342, which indicates which of user applications 302*a-n* are selected for output through the integrated display device and which are selected for output through the projection interface.

Allocation data 342 may be based on user selections. In embodiments, such selections may be made through gestures. For instance, a user may gesture to move application(s) across displays. As an example, a user may make a sweeping gesture over an application shown on the integrated display device to send it to the projection interface. Conversely, a similar sweeping gesture may be made over an application shown on the projection interface to send it to the integrated display device.

An active area on the edge of the displays may be employed for identifying such gestures. For instance, a touch gesture with a sweeping motion that ends at the edge of the display means the touched application is to be moved to another display (e.g., to the projection interface or the integrated display device).

Users may sometimes want a user application to appear and/or behave differently based on the display device to which it is being output. For example, a music player may be easier to use when it is projected on the projection interface when it has larger fonts and buttons than are preferable for the integrated display device.

As shown in FIG. 3, application allocation module 326 includes an application profile database 344 that may store settings for user application 302*a-n*. For each of these user applications, these settings may specify various output and/or input features (e.g., font size, button size, etc.) for the integrated display device and for the projection interface. In embodiments, such settings may be user selected. Alternatively or additionally, such settings may be preset or predetermined.

Thus, when these user applications are output, the settings in profile database 344 corresponding to employed display (e.g., integrated display device or the projection interface) are automatically applied.

Figure 4:
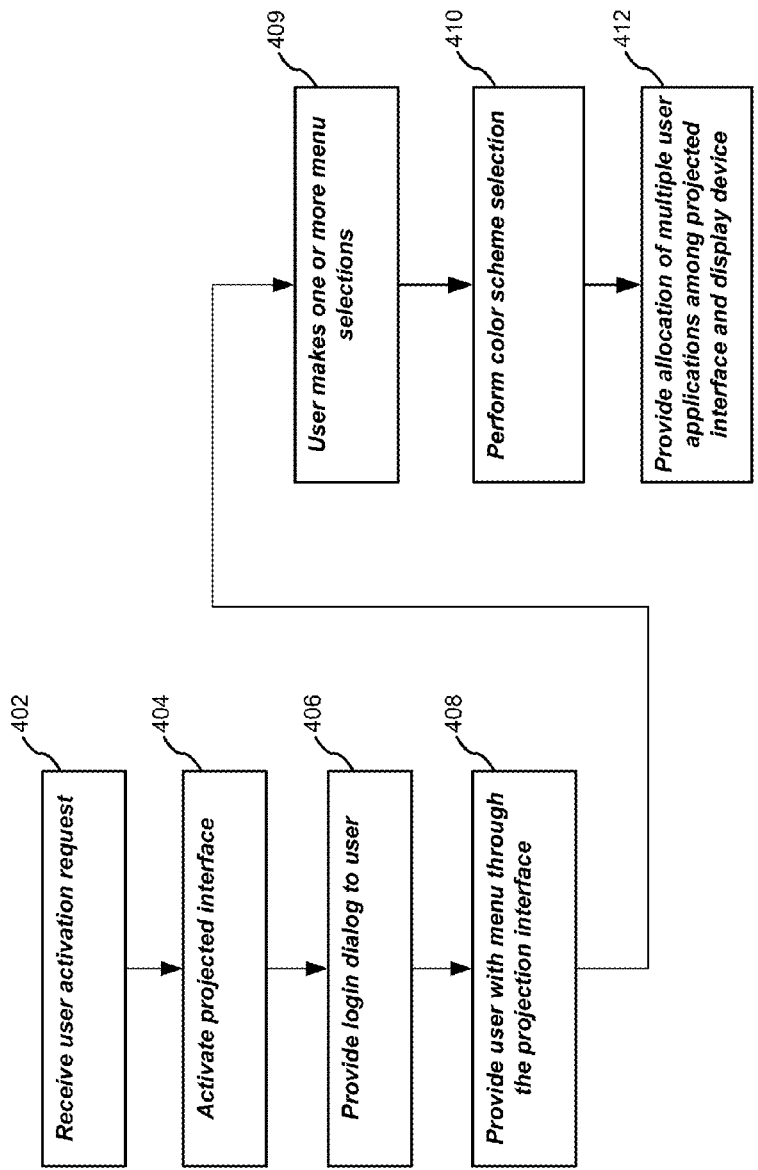
FIG. 4 is a logic flow diagram.

FIG. 4 illustrates an exemplary logic flow 400, which may be representative of operations executed by one or more embodiments described herein. Thus, this flow may be employed in the context of FIG. 3. Embodiments, however, are not limited to this context. Also, although FIG. 4 shows particular sequences, other sequences may be employed. Moreover, the depicted operations may be performed in various parallel and/or sequential combinations.

At a block 402, a user activation request is received. This request may be a predetermined gesture. Thus, in the context of FIG. 1, this may involve gesture sensor module 110 detecting this gesture. Based on this request, a projection interface (e.g., a MTPD) is activated at a block 404.

As indicated by a block 406, activation of the projection interface may result in a login or user authentication dialog being provided to the user. This dialog may be provided through the projection interface.

At a block 408, the projection interface provides the user with a menu, such as the device control menu described above with reference to FIG. 3. Accordingly, this menu may provide the user with the ability to select various device settings and/or display management attributes.

As described above, such device settings may include (but are not limited to any combination of) audio output volume, projection interface display brightness, projection interface display contrast, projection interface display focus, projection interface font size, projection interface projector on/off, Gesture sensor on/off, and integrated display device on/off. Also, such display management attributes may include Also, this menu may allow the user to select a primary display (e.g., the integrated display device or the projection interface). Additionally or alternatively, this menu may allow the user to select among various display modes (e.g., a duplicate display mode, an extended desktop mode, and an appliance mode).

Accordingly, FIG. 4 shows the user making one or more menu selections at block 409.

As described herein, projection display settings may be selected. For instance, FIG. 4 shows a color-scheme selection being made for the projected display at a block 410. This selection may be automatic (e.g., based on automatic contrast measurements) or through a user selection (e.g., through the menu provided at block 408).

Further, FIG. 4 shows (at a block 412) allocations of user applications being made among the projected interface and a display device. This allocation may be automatically determined or determined through user selections (e.g., reallocating gestures).

Figure 5:
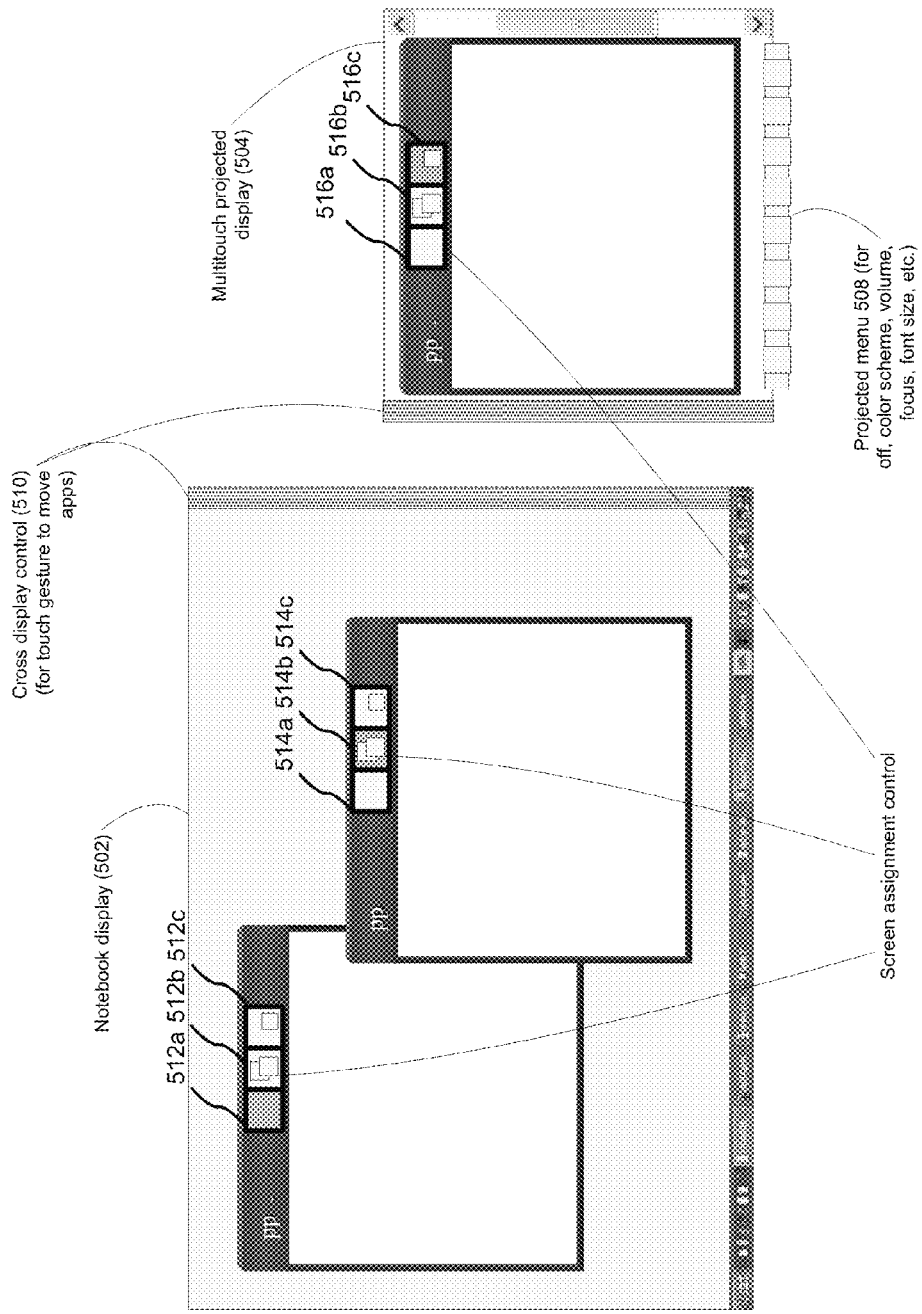
FIG. 5 is an exemplary user interface view.

FIG. 5 provides a view 500 of an exemplary user interface. In particular, FIG. 5 shows a notebook display device 502 and MTPD 504. Further, FIG. 5 shows multiple GUI windows. In particular, FIG. 5 shows windows 506a and 506b being output through display device 502, and a window 506c being output through MTPD 504. Within a top bar of each of window 506a-c a screen assignment control is provided.

In embodiments this allows a user (e.g., through GUI input techniques, and/or touch activation, etc.) to allocate each window between display device 502 or MTPD 504, or both. Such allocation actions may involve selecting and dragging an icon (e.g., a rectangle) representing a window into one or more display boxes. Such boxes may include a box for display device 502, a box for MTPD 504, and a box for both display device 502 and MTPD 504. As examples of such features, FIG. 5 shows boxes 512a-c, 514a-c, and 516a-c.

As described herein, embodiments may provide a projected interface having a menu. As an example, FIG. 5 shows a projected menu 508 projected within MTPD 504. As shown in FIG. 5, this menu includes multiple buttons. Embodiments, however, are not limited to an arrangement of buttons.

Also, FIG. 5 shows control regions 510 for gesture-based (e.g., tag and drag) allocation of applications between display device 502 and MTPD 504.

Although FIG. 5 is a view involving a notebook computer, embodiments are not limited to such devices. Accordingly such features may be provided in context involving other device types.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, the techniques described herein are not limited to using binary numbers. Thus, the techniques may be employed with numbers of any base.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
    receiving a user activation request for a projected user interface at a computing device having a display device, a non-projected interface, and a projector, the request being in the form of a predetermined user gesture in a predetermined detection region of a gesture sensor module of the computing device;
    wherein receiving the user activation request comprises detecting a user gesture through a gesture sensor module independent of the non-projected interface and independent of any keyboard, touchpad, and buttons of the computing device;

based on the user activation request, activating the projected user interface by projecting the projected user interface onto a surface using the projector and registering touches on the surface;

wherein the projected user interface presents a device settings menu, the menu providing one or more setting selections to adjust the projected user interface independent of setting selections for the display device; and wherein the menu is to allow the user to select among a plurality of display modes with respect to the display device and the projector, the plurality of display modes comprising a duplicate display mode, an extended desktop mode, and an appliance mode.

2. The method of claim 1, further comprising providing a user login dialog through the projected user interface based on the user activation request before presenting the device settings menu, the login dialog requiring a user authentication before providing access to some but not all applications of the computing device.

3. The method of claim 1, further comprising:

receiving a move gesture at the gesture sensor module related to an application window on the display device;

providing an allocation of a plurality of applications between the projected user interface and the display device;

allocating the application window on the display device to the projected user interface based on the move gesture.

4. The method of claim 3, further comprising:

receiving a user selection to change the allocation of applications between the projected user interface and the display device as selecting and dragging an icon on the projected user interface; and changing the allocation based on the user selection.

5. The method of claim 4, wherein receiving the user selection to change the allocation comprises detecting a user gesture.

6. The method of claim 1, further comprising receiving a selection of a color scheme for the projected user interface on the device settings menu of the projected user interface; and modifying the color scheme of only the projected user interface based on the selection.

7. The method of claim 6, further comprising:

storing a color scheme database that includes configuration information for multiple color schemes for a projected user interface;

receiving measurements conveying characteristics of a currently projected projection interface from a projection interface control module; and selecting a stored color scheme upon receiving the user activation request wherein said selecting is performed automatically based on the received measurements.

8. The method of claim 6, wherein said receiving a selection is a selection of a stored color scheme from the user.

9. The method of claim 1, wherein the projected user interface comprises a multi-touch projected display (MTPD).

10. The method of claim 1, further comprising:

allocating user gesture commands to application(s) provided by one of the projected user interface and the display device; and allocating user voice commands to application(s) provided by one of the projected user interface and the display device.

11. An apparatus, comprising:

a device including a projector to provide a projected user interface;

a display device;

a non-projected interface;

a gesture sensor module to receive a user activation request to activate the projected user interface, the request being in the form of a predetermined user gesture in a predetermined detection region of a gesture sensor module of the computing device;

a user interface management module to provide a device settings menu through the projected user interface in response to the received request;

wherein the menu provides one or more setting selections to adjust the projected user interface independent of setting selections for the display device; and wherein the menu is to allow the user to select among a plurality of display modes with respect to the display device and the projector, the plurality of display modes comprising a duplicate display mode, an extended desktop mode, and an appliance mode; and wherein the user interface management module is to cause an activation of the projected user interface upon receipt of a user activation request gesture received independent of the non-projected interface and independent of any keyboard, touchpad, and buttons of the computing device.

12. The apparatus of claim 11, wherein the user interface management module is to provide an allocation of a plurality of applications among the projected user interface and the display device by receiving a move gesture at the gesture sensor module related to an application window on the display device and allocating the application window on the display device to the projected user interface.

13. The apparatus of claim 12, wherein the allocation is based on a user selection and on allocation data stored in the computing device the allocation data including output and input features for the projected user interface.

14. The apparatus of claim 13, wherein the user selection is a user gesture detected by the gesture sensor module as selecting and dragging an icon on the projected user interface.

15. The apparatus of claim 11, wherein the predetermined detection region is in proximity of the display device.

16. The apparatus of claim 11, wherein the apparatus is one of a notebook personal computer, a desktop personal computer, and a tablet personal computer.

17. An article comprising a non-transitory machine-readable medium having stored thereon instructions that, when executed by the machine, cause the machine to:

receive a user activation request for a projected user interface at a computing device having a display device, a non-projected interface, and a projector, the request being in the form of a predetermined user gesture in a predetermined detection region of a gesture sensor module of the computing device;

wherein receiving the user activation request comprises detecting a user gesture through a gesture sensor module independent of the non-projected interface and independent of any keyboard, touchpad, and buttons of the computing device;

based on the user activation request, activate the projected user interface by projecting the projected user interface onto a surface using the projector and registering touches on the surface;

wherein the projected user interface presents a device settings menu, the menu providing one or more setting selections to adjust the projected user interface independent of setting selections for the display device; and wherein the menu is to allow the user to select among a plurality of display modes with respect to the display device and the projector, the plurality of display modes comprising a duplicate display mode, an extended desktop mode, and an appliance mode.

* * * * *